UNITED STATES PATENT OFFICE.

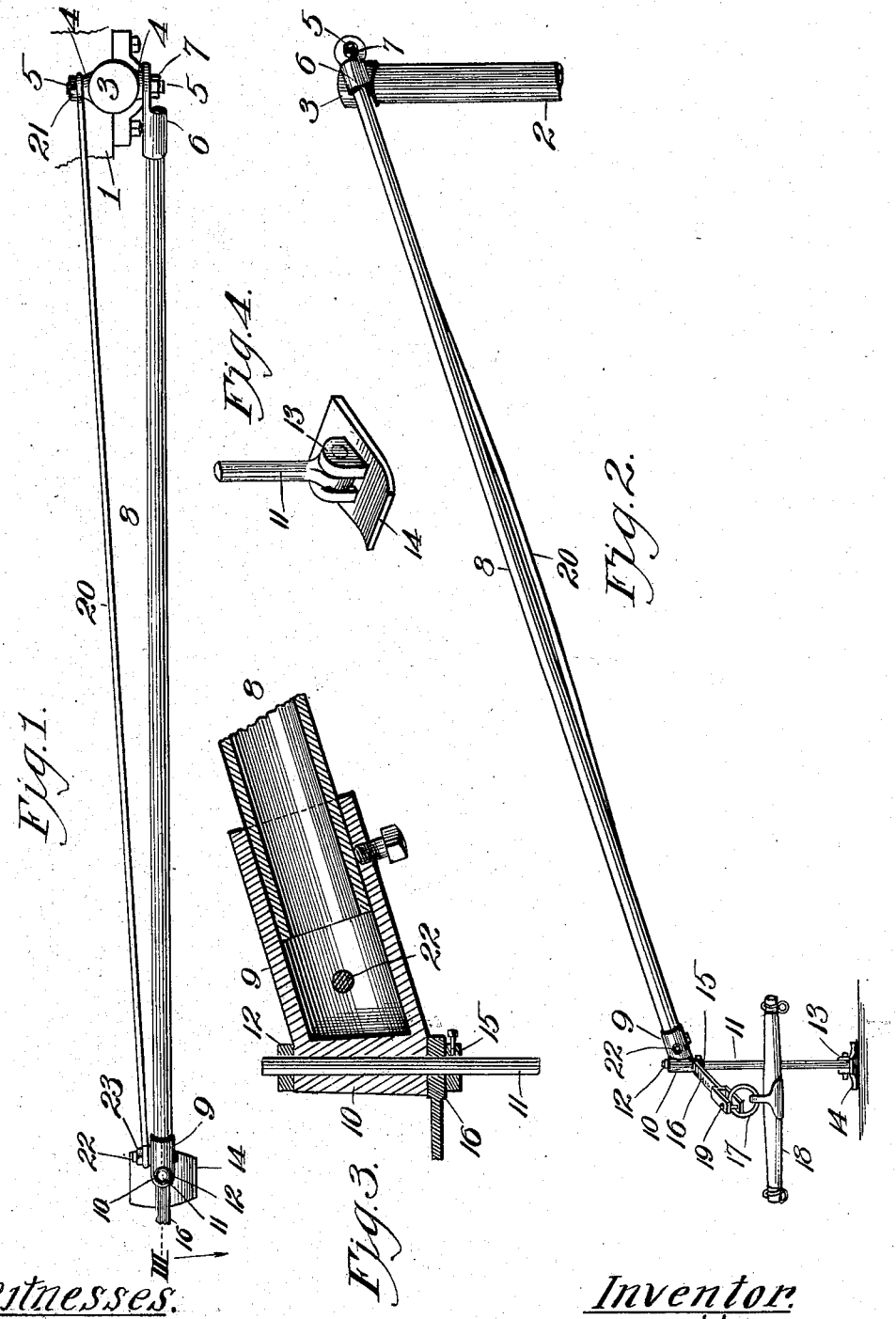

JOSIAH S. TUTTLE, OF BELLEVUE, OHIO, ASSIGNOR TO OHIO CULTIVATOR COMPANY, OF BELLEVUE, OHIO, A CORPORATION.

HORSE-POWER.

No. 885,892.    Specification of Letters Patent.    Patented April 28, 1908.

Application filed September 3, 1907. Serial No. 390,999.

*To all whom it may concern:*

Be it known that I, JOSIAH S. TUTTLE, a citizen of the United States, residing at Bellevue, in the county of Huron and State of Ohio, have invented certain new and useful Improvements in Horse-Powers, of which the following is a specification.

This invention relates to horse powers and consists in certain novel and peculiar features of construction and organization as hereinafter described and claimed; and in order that it may be fully understood reference is to be had to the accompanying drawing, in which—

Figure 1 is a plan view of a horse power embodying my invention. Fig. 2, is a perspective view of the same. Fig. 3, is an enlarged vertical section taken on the dotted line III of Fig. 1. Fig. 4, is a detail perspective view of a portion of the support for the free end of the sweep.

In the said drawing, 1 indicates a bearing of any suitable type, and 2 a vertical shaft journaled therein and adapted for transmitting motion in any suitable manner 3 indicates a sweep head secured rigidly upon the upper end of the shaft 2 and provided with oppositely projecting arms or bosses 4 equipped with bolt ends 5, and pivotally mounted for movement in a vertical plane on one of said bolt ends is a casting 6, a nut 7 securing the same upon said bolt end and against the face of the contiguous arm or boss 4.

8 indicates the sweep preferably in the form of a long pipe pitched downward toward its free or outer end and secured at its upper or inner end in casting 6. At its outer or free end it is secured in a sleeve 9 provided at its outer end with a vertical sleeve or boss 10 through which extends a vertical standard 11 equipped at its upper end with a collar 12 to prevent it from slipping down through the boss 10. At its lower end the standard 11 is pivoted to a pair of ears 13 projecting upward from a runner or other ground-engaging device 14 which curves upward at its front end so as to ride over ordinary obstructions in its path.

15 is a collar secured on standard 11 below the boss as a support for the draft bar 16, pivoted on said standard for movement in a horizontal plane, the outer end of the draft bar being forked to receive a ring 17 to which is attached a swingle-tree 18, a bolt 19 extending through the outer end of the fork to prevent dislocation of the ring.

To stiffen the sweep, a brace rod 20 is pivoted on the bolt end at the opposite side of the shaft from the sweep and is secured thereon against the contiguous boss by a nut 21. The outer end of the brace is secured to cross bolt 22 carried by sleeve 9 by a nut 23. In practice as a draft animal hitched to the swingle-tree, travels in the direction indicated by the arrow, Fig. 1, the shaft 2 is turned. Ordinarily the pull of the draft animal will hold the runner or ground-engaging device off the ground, said device engaging the ground whenever the pull slackens. If desired the standard can be so adjusted that the runner or its equivalent will travel upon the ground at all times, it being obvious that whenever the runner travels over irregularities in the surface of the ground the sweep will swing upward to accommodate such irregularities.

From the above description it will be apparent that I have produced a horse power possessing the features of advantage enumerated as desirable in the statement of the invention and I wish it to be understood that I do not desire to be restricted to the exact details of construction shown and described as obvious modifications will occur to one skilled in the art.

Having thus described the invention what I claim as new and desire to secure by Letters Patent, is:

In a horse-power, the combination of a vertical shaft, a cap on the upper end of the same having diametrically opposite bosses, a sweep pivoted upon one of said bosses, a brace pivoted on the other of said bosses, a sleeve secured on the free end of the sweep and provided with a vertically-disposed tubular boss, the outer end of the brace being secured to the side of said sleeve, a standard fitted in the tubular boss and carrying a ground-engaging device at its lower end, a draft-bar pivotally mounted on the standard, and a whiffletree carried by the outer end of said draft-bar.

In testimony whereof I affix my signature, in the presence of two witnesses.

JOSIAH S. TUTTLE.

Witnesses:
JOSEPH E. MARVIN,
E. H. ERDRICH.